J. MERRITT & E. W. SMITH.
MACHINE FOR CLEANING THE EXTERIORS OF RECEPTACLES.
APPLICATION FILED OCT. 30, 1912.

1,134,213.

Patented Apr. 6, 1915.
5 SHEETS—SHEET 1.

Witnesses:
C. H. Storrs
H. E. Leaver.

Inventors:
Joseph Merritt
Ernest Walker Smith
by Harry R. Williams
Attorney.

J. MERRITT & E. W. SMITH.
MACHINE FOR CLEANING THE EXTERIORS OF RECEPTACLES.
APPLICATION FILED OCT. 30, 1912.

1,134,213.

Patented Apr. 6, 1915.

5 SHEETS—SHEET 2.

Witnesses:
C. H. Ston
H. E. Seaver

Inventors:
Joseph Merritt
Ernest Walker Smith
by Harry R. Williams
Attorney.

J. MERRITT & E. W. SMITH.
MACHINE FOR CLEANING THE EXTERIORS OF RECEPTACLES.
APPLICATION FILED OCT. 30, 1912.

1,134,213.

Patented Apr. 6, 1915.
5 SHEETS—SHEET 3.

Witnesses:
C. H. Storrs
H. E. Leaver

Inventors:
Joseph Merritt
Ernest Walker Smith
by Harry P. Williams
Attorney.

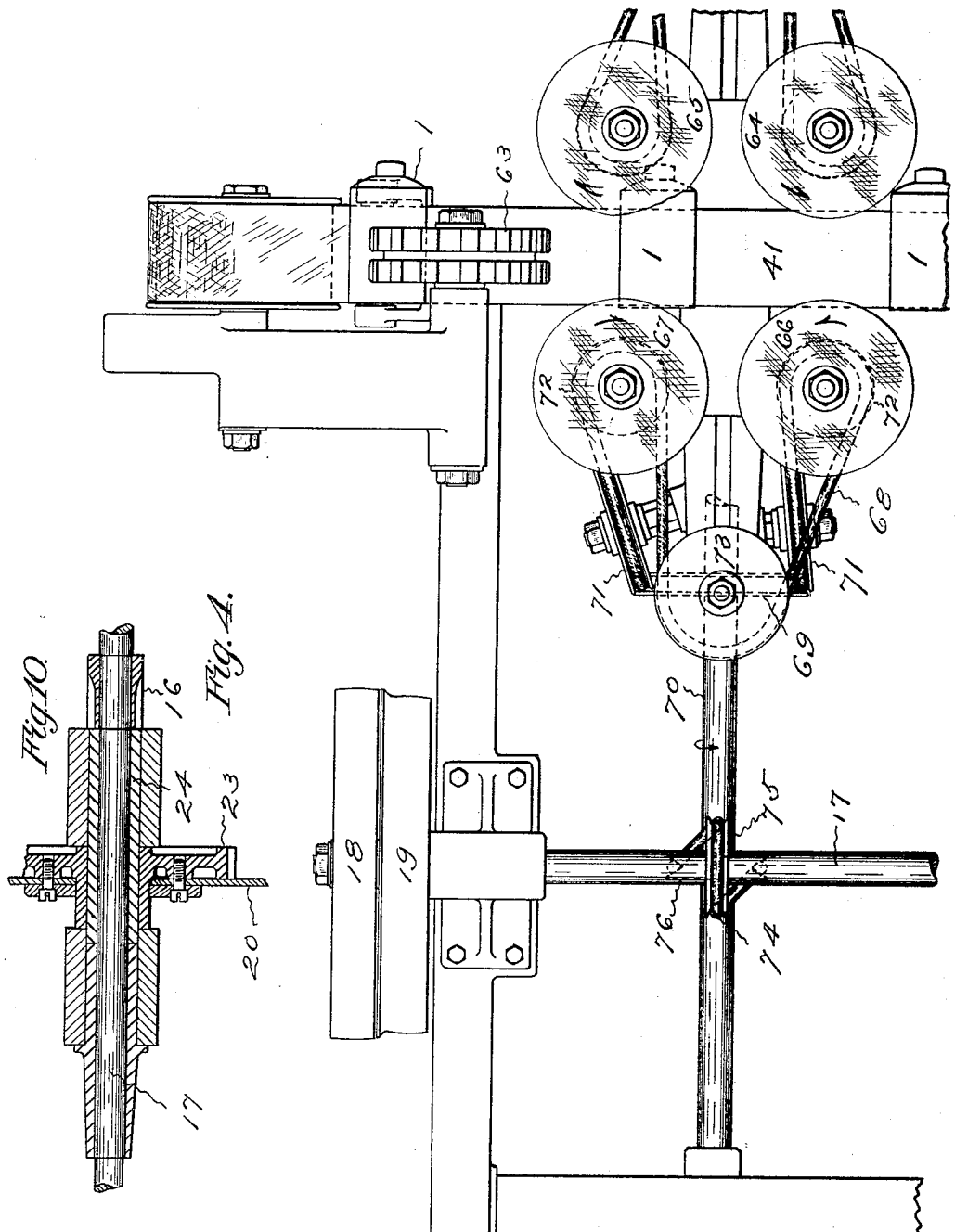

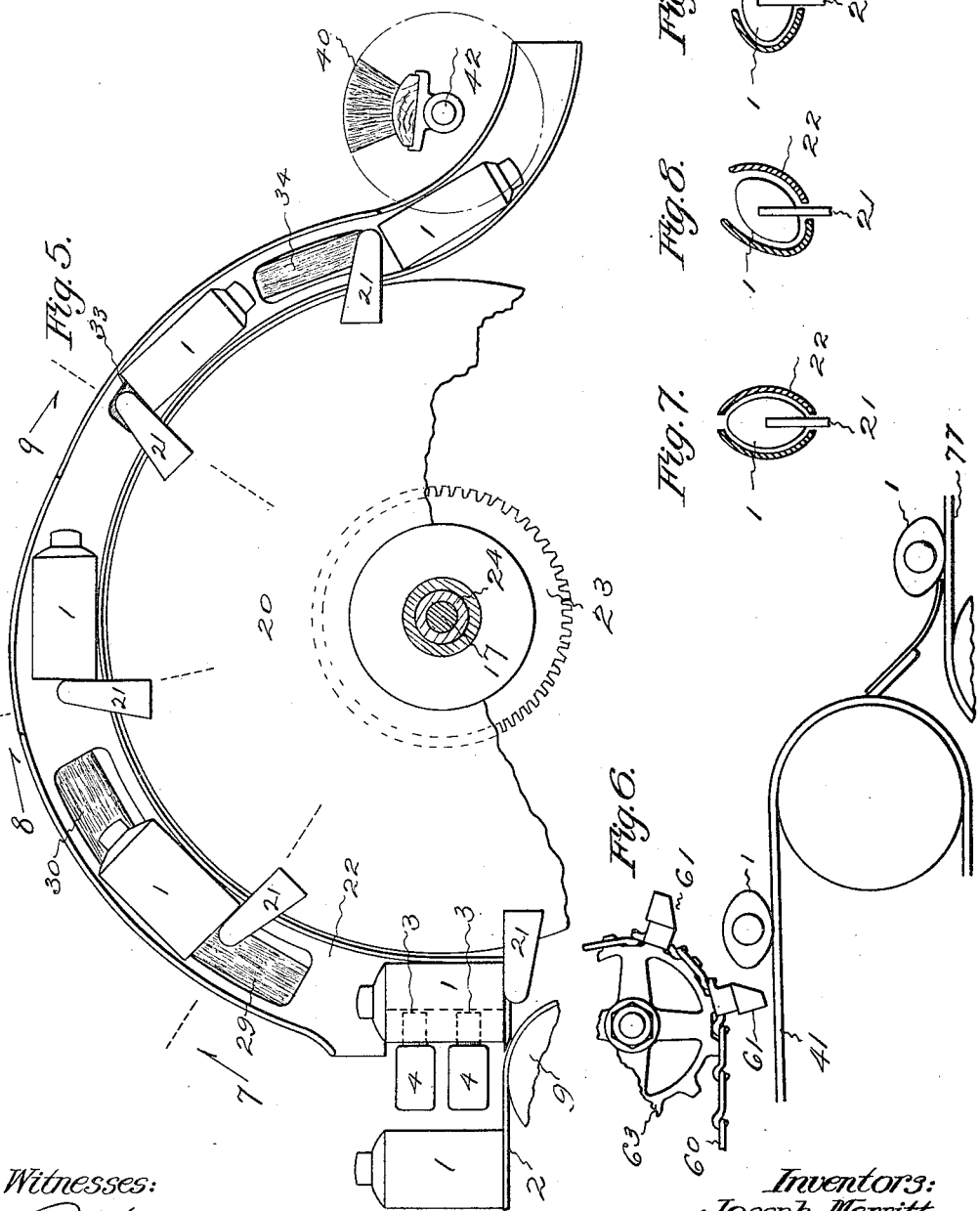

UNITED STATES PATENT OFFICE.

JOSEPH MERRITT AND ERNEST WALKER SMITH, OF HARTFORD, CONNECTICUT.

MACHINE FOR CLEANING THE EXTERIORS OF RECEPTACLES.

1,134,213.  Specification of Letters Patent.  Patented Apr. 6, 1915.

Application filed October 30, 1912. Serial No. 728,629.

*To all whom it may concern:*

Be it known that we, JOSEPH MERRITT and ERNEST WALKER SMITH, citizens of the United States, residing at Hartford, in the county of Hartford and State of Connecticut, have invented a new and useful Improvement in Machines for Cleaning the Exteriors of Receptacles, of which the following is a specification.

This invention relates to a machine which is designed to wipe off, clean and polish the exterior surfaces of receptacles.

The embodiment of the invention illustrated is particularly designed for cleaning the surfaces of such cans as have been filled with talc powder, tooth powder, or the like toilet preparations.

The object of the invention is to provide a machine which will rapidly take in, feed through, efficiently clean the exteriors and deliver such receptacles.

In the machine illustrated as one embodiment of the invention the cans are placed in a vertical position upon a belt which feeds them to devices that pass them into a guide-way through which they are advanced by a carrier. In the guide-way, first, the two sides are rubbed by rapidly revolved rag wheels and then the cans are turned over and the two edges are rubbed by rapidly revolved rag wheels. From this guide-way devices feed the cans to a belt which, with a feed chain that coöperates with the belt, carries them between rapidly revolved rag wheels that rub the ends, and then passes them out of the machine.

Figure 1:
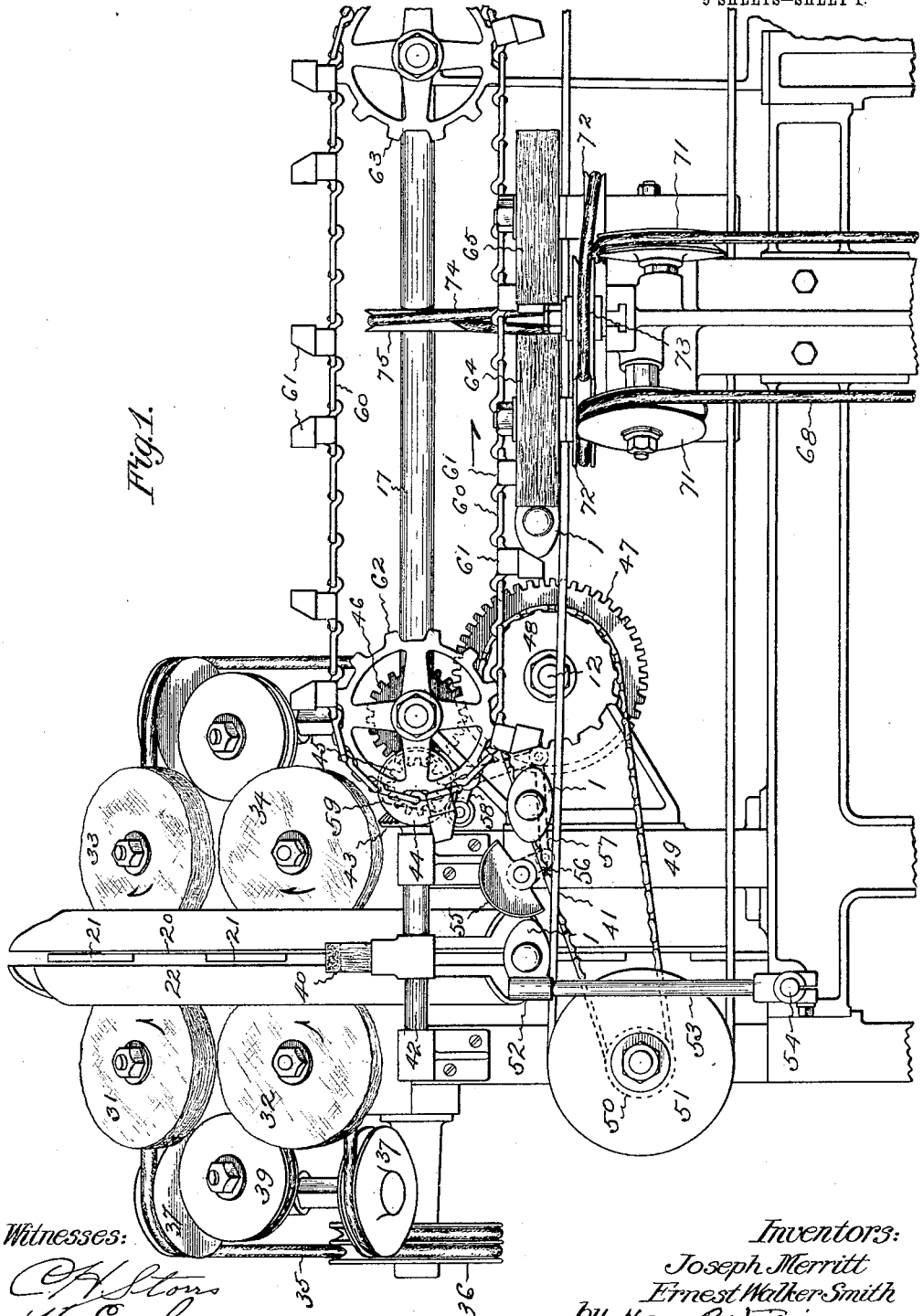
Figure 2:
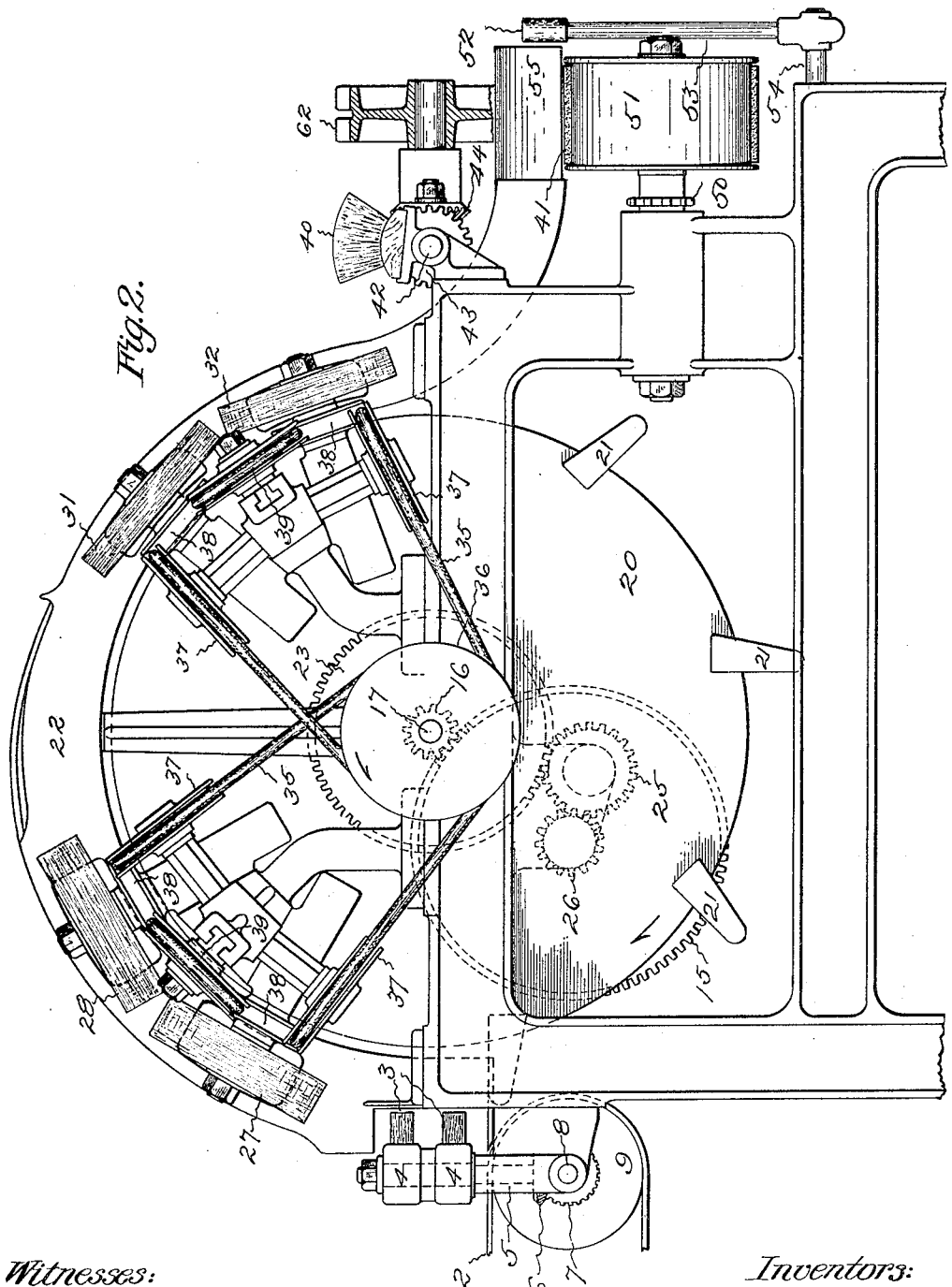
Figure 3:
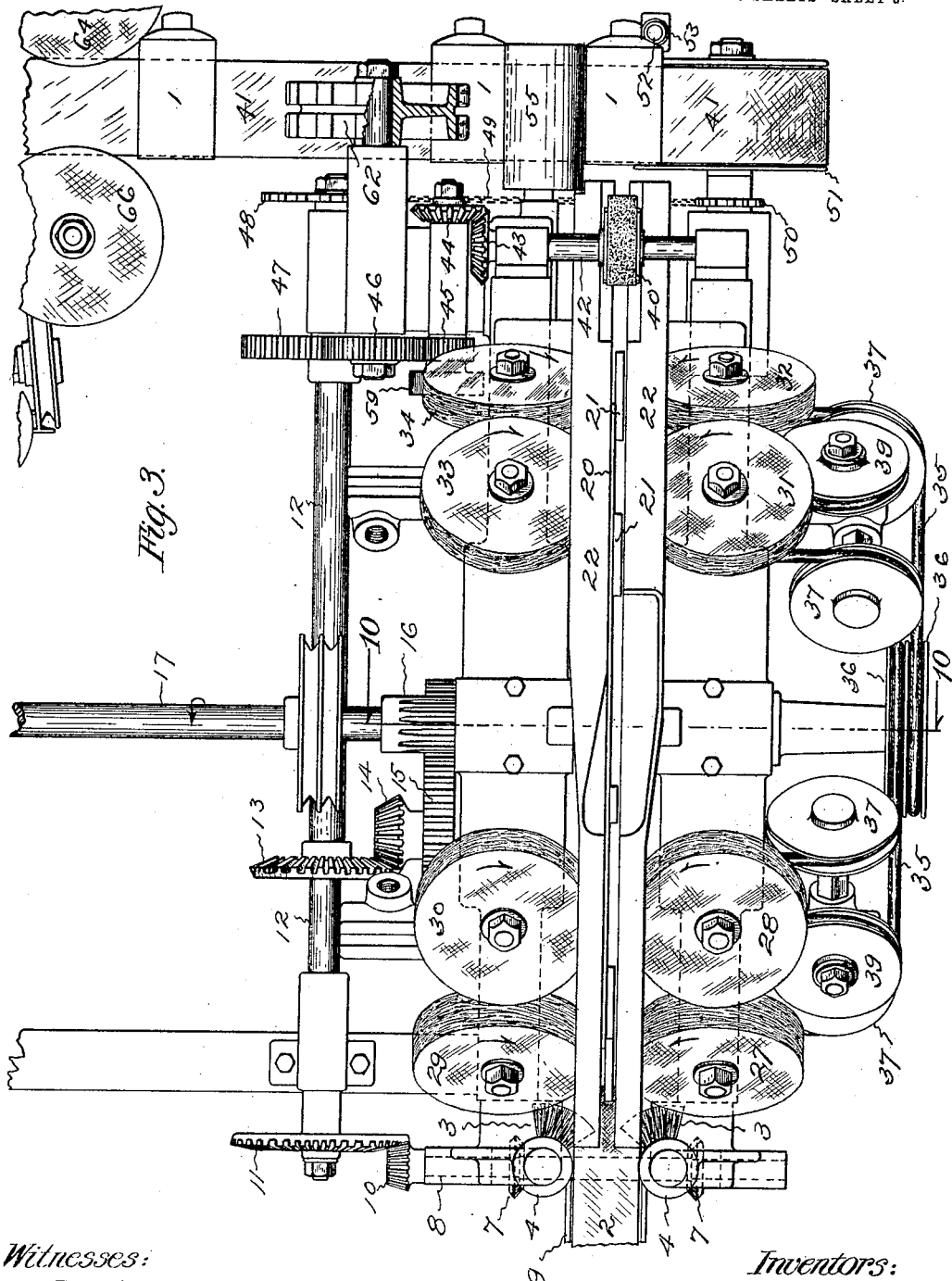

Figure 1 of the accompanying drawings shows an elevation of the delivery side of the machine. Fig. 2 shows an elevation of the front of the machine. Fig. 3 shows a plan of part of the machine. Fig. 4 shows a plan of the other part of the machine. Fig. 5 is a vertical section taken through the guide-way, showing the way the cans are carried therethrough. Fig. 6 is an elevation showing a portion of the mechanism at the delivery end of the machine. Fig. 7 shows a cross section of the guide-way on the plane indicated by the dotted line 7 on Fig. 5. Fig. 8 shows a section on the plane indicated by the dotted line 8 on Fig. 5. Fig. 9 shows a section on the plane indicated by the dotted line 9 on Fig. 5. Fig. 10 shows a section through the bearings of the carrier on the plane indicated by the dotted line 10—10 on Fig. 3.

The cans 1 are brought to the machine illustrated standing upright by an endless belt 2 that travels toward one side of the machine. This belt may bring the cans from another machine, such as a weighing, filling and capping machine, or the cans may be placed thereon by hand. From this belt the cans are fed into the machine. The means illustrated for this purpose are revolving brushes 3 that are arranged two on each side above the plane of the belt. These brushes project from hubs 4 fastened to shafts 5 which have bevel gears 6 that mesh with bevel gears 7 on the horizontal shaft 8 that carries the drum 9 around which the feed belt 2 passes. (Figs. 2, 3). On one end of the horizontal shaft 8 is a bevel pinion 10 which is engaged by a bevel gear 11 on a shaft 12 on which is a bevel gear 13. Engaging with this gear 13 is a pinion 14, the hub of which is connected with a gear 15 that is engaged by a pinion 16 on the driving shaft 17, (Fig. 3), which carries the usual fast and loose pulleys 18 and 19. (Fig. 4). When this mechanism is in operation, the cans are brought by the feed belt to the side of the machine and by the revolving brushes are passed into the path of the carrier arms. The feed brushes time the arrival of the cans to the carrier arms, and hold them so they will not be upset or caught and jammed when the carrier takes them up, and being soft and flexible they do not force and crowd the cans, nor injure the enamel or other finish.

The carrier is a thin circular disk 20 provided with arms 21 that project approximately radially of the disk. When the machine is in operation the carrier arms advance the cans through a curved guide-way 22. (Fig. 5). The carrier disk is fastened to a gear 23, the hub of which turns loosely on a sleeve 24 through which the driving shaft 17 extends. (Figs. 5, 10). The gear 23, to which the carrier disk is fastened, is engaged by a pinion 25 that meshes with a pinion 26 on the shaft carrying the gear 15 that is driven by the pinion 16 on the driving shaft (Fig. 2).

The guide-way 22 through which the cans are advanced by the carrier arms, is made in two complementary arc-shaped sections that are concentric with the carrier, a space being left between them for the passage of the carrier arms. When cans that are oval in cross section are to be put through and cleaned by this machine, these sections of the guide-way are shaped first narrow and deep (Fig. 7) so that the cans will go in and be carried up edgewise, and then shallow and wide (Fig. 9) so that the cans will be turned one quarter around and pass out flatwise, (Figs. 3, 5), there being an intermediate quarter turn spiral in the way to accomplish this. This is designed in this manner so that by a single carrier which travels in one plane the sides of the cans may first be brushed, cleaned and polished by the rapidly rotated rag wheels 27 and 28 that project into the guide-way on one side, and 29 and 30 that project into the guide-way on the other side, and then as the carrier advances the cans, the edges will be brushed, cleaned and polished by the rapidly rotating rag wheels 31 and 32 that project into the guide-way on one side, and 33 and 34 that project into the guide-way on the other side. (Figs. 3, 5). Each pair of rag wheels is rotated at high speed by an endless belt 35 that passes around a pulley 36 on the driving shaft 17, over idlers 37, around pulleys 38 on the axles of the rag wheels and around an adjustable intermediate idler pulley 39. (Figs. 2, 3).

The cans, after having their sides and edges cleaned, are by a revolving brush 40 pushed out of the end of the arc-shaped guide-way onto an endless traveling belt 41. (Figs. 1, 2, 3). This brush is mounted on a shaft 42 which has a bevel gear 43 in mesh with which is a bevel gear 44 on a shaft that has a pinion 45 which meshes with a gear 46 (Figs. 1, 3), that is engaged by a gear 47 on the shaft 12. On the end of the shaft 12 is a sprocket wheel 48 which is connected by a chain 49 with a sprocket 50 on the shaft which carries the drum 51, around which the traveling belt 41 passes. (Figs. 1, 3). In order to prevent the revolving delivery brush 40 from pushing the cans too far onto the belt 41, a stop 52 is arranged at one side of the belt opposite the end of the guide-way. (Figs. 1, 3). This stop is at the upper end of a rod 53 that is adjustably mounted on a stud 54 which is fastened to the frame of the machine. (Figs. 1, 2).

An oscillatory gate 55 which is substantially semi-cylindrical in form is arranged adjacent to the end of the guide-way. (Figs. 1, 3). This gate keeps the cans alined on the belt as they are delivered from the carrier to the belt which travels at right angles to the plane of rotation of the carrier, and also properly spaces the cans on the belt so they will be correctly timed with relation to the arms of the chain carrier. The gate which is hollow and projects over the belt is mounted on a shaft having a rocker arm 56 which is connected by a link 57 with the end of a bell crank lever 58 that is oscillated by a cam 59. (Fig. 1). This cam is connected with the gear 45 that is driven by the gears 46 and 47 from the shaft 12. (Fig. 3). When this mechanism turns the gate over one way, the cans are drawn against it and retained straight on the belt 41, but when the gate is turned over the other way the cans are free to be carried by the belt into the gate, which is so actuated that it releases the cans properly located on the belt to be engaged by the chain carrier which coöperates therewith.

When the gate is turned so as to release a can, the belt carries the can beneath a chain 60 which has carrier arms 61 arranged in pairs. This chain passes around a sprocket 62 that is on the shaft carrying the drive gear 46, and an idle sprocket 63. (Fig. 1). The carrier arms 61 come down, and grasping a can on each side, hold it while it is being carried along by the belt between the rag wheels 64 and 65 on one side of the belt and chain, and the rag wheels 66 and 67 on the other side of the belt and chain. As the carrier chain travels around the sprockets the arms open to receive the cans, close to grasp and hold the cans square on the belt and carry them against the resistance of the rotating rag wheels and then open to release the cans. One pair of these rag wheels wipe, clean, and polish the top end, and the other pair wipe, clean, and polish the bottom end of the cans. (Fig. 4). These wheels are rotated in opposite directions so that not only the surfaces but in the corners about the cap at the top and in the corners around the bottom all dust will be thoroughly wiped out, one wheel in each side rotating one way so as to get into the corners on one side and the other wheel on each side rotating reversely so as to get into the corners on the other side. Each set of wheels is driven by similar means. This means consists of an endless belt 68 that passes around a pulley 69 on a shaft 70 and over idler pulleys 71 and then around pulleys 72 on the rag wheel axles and about an adjustable intermediate idler 73. The shaft 70 is driven from the driving shaft 17 by an endless belt 74 that passes around a pulley 75 on shaft 17 and a pulley 76 on shaft 70. (Fig. 4). After passing these rag wheels, which clean the tops and the bottoms, the cans are carried by the belt 41 and delivered from the machine to a belt 77 that may carry them to the packer. (Fig. 6).

The machine shown as illustrating an embodiment of the invention is, as explained, designed to wipe, clean and polish the form of can commonly used for holding talc powder and the like toilet compound. The invention, however, is of course not limited to a machine designed for this specific form of can, as other forms of cans, boxes and receptacles can be rapidly and thoroughly cleaned by the machine, the only change necessary being in the design of the guides and carriers, such as will readily suggest themselves to those skilled in the art. And while the cleaning wheels have been described as "rag wheels" they may, of course, be made of any suitable materials.

The invention claimed is:

1. A machine for cleaning the exteriors of receptacles, having a way that is curved longitudinally and twisted transversely for guiding the receptacles and giving them a quarter turn while passing therethrough, a rotary carrier with its periphery projecting into said curved and twisted way for advancing the receptacles therethrough, mechanism for rotating the carrier, cleaning wheels projecting into the way on both sides near the entrance end, cleaning wheels projecting into both sides of the way near the delivery end, and mechanism for rotating the cleaning wheels.

2. A machine for cleaning the exteriors of receptacles, having a curved way for guiding and turning over the receptacles, a rotatory carrier, arms projecting from the carrier into the said way for advancing the receptacles longitudinally therethrough, mechanism for rotating the carrier, cleaning wheels projecting into the path of the receptacles near the entrance end of the way, cleaning wheels projecting into the path of the receptacles near the delivery end of the way, and mechanism for rotating the cleaning wheels.

3. A machine for cleaning the exteriors of receptacles, having a longitudinally curved and transversely twisted way for guiding and turning over the receptacles, a rotatory carrier with arms projecting into said way for advancing the receptacles therethrough, mechanism for rotating the carrier, cleaning wheels projecting into the way in the path of the receptacles, and mechanism for rotating the cleaning wheels.

4. A machine for cleaning the exteriors of receptacles, having a longitudinally curved and transversely twisted guide-way, a rotatory carrier with arms projecting into said way for advancing the receptacles therethrough, mechanism for rotating the carrier, and means for cleaning the receptacles while being advanced through said way by said carrier.

5. A machine for cleaning the exteriors of receptacles, having a way for guiding the receptacles, a carrier for advancing the receptacles through said way, wheels projecting into the way in the path of the receptacles for cleaning the sides thereof, means for carrying the receptacles away from the guide-way, and wheels rotating in opposite directions on each side of and projecting into the path of the receptacles carried by said means for completely cleaning both ends of the receptacles.

6. A machine for cleaning the exteriors of receptacles, having a belt for conveying the receptacles, a gate for spacing the receptacles on said belt, a carrier arranged adjacent to said belt for retaining the receptacles while they are carried by the belt, wheels projecting into the path of the ends of the receptacles while they are being carried by the belt, mechanism for moving the belt and carrier, and mechanism for rotating the cleaning wheels on each side in opposite directions whereby they will thoroughly wipe all parts of both ends of the receptacles.

7. A machine for cleaning the exteriors of receptacles, having a belt for conveying the receptacles, a movable gate for locating and timing the receptacles on said belt, a carrier arranged adjacent to said belt for keeping the receptacles in position while they are carried by the belt, and means for cleaning the ends of the receptacles while they are being carried by the belt.

8. A machine for cleaning the exteriors of receptacles, having a rotatory carrier, a guide-way encircling and inclosing a portion of the periphery of said carrier, said guide-way being shaped to give the receptacles a quarter turn as they are advanced therethrough by the carrier, cleaning wheels projecting into the guide-way near the entrance end, and cleaning wheels projecting into the guide-way near the delivery end.

9. The combination in a machine for cleaning the exteriors of receptacles of a circular carrier, means for rotating the carrier, a curved guide-way extending about a portion of the periphery of the carrier, said guide-way having openings through its side and inner walls, arms projecting radially at intervals from the carrier into the guide-way, cleaning wheels with their peripheries extending into the sides of the guide-way, and means for rotating the cleaning wheels.

10. A machine for cleaning the exteriors of receptacles, having an arc-shaped way for guiding and turning over the receptacles, a circular carrier with arms for advancing the receptacles along said way, mechanism for rotating the carrier, and means for cleaning all sides of the receptacles while being carried along said way.

11. A machine for cleaning the exteriors of receptacles having a rotatory receptacle carrier, means for rotating the carrier, a fixed guide-way concentric with and inclosing a portion of the periphery of said carrier, said way being shaped to turn the receptacles 90 degrees while they are being carried therethrough, and means for rubbing the sides of the receptacles while the carrier is advancing them through said concentric way.

12. A machine for cleaning the exteriors of receptacles, having an endless belt for receiving the receptacles, automatically opening and closing means coöperating with the delivery belt and positively carrying the receptacles along therewith, and cleaning wheels projecting into the path of the receptacles carried by and held on said belt for cleaning the ends of the receptacles.

13. A machine for cleaning the exteriors of receptacles having means for retaining and carrying the receptacles sidewise, oppositely rotating wheels on one side for cleaning one end of the receptacles carried by said means, oppositely rotating wheels on the other side of the carrier for cleaning the other ends of the receptacles carried thereby, said wheels turning on axes at right angles to the direction of feed of said carrying means and having their peripheries projecting into the path of the receptacles so as to engage with the ends thereof.

14. A machine for cleaning the exteriors of receptacles having a guide-way, means for advancing the receptacles endwise through said guide-way, means arranged in connection with the guide-way for causing the receptacles to turn over sidewise on their longitudinal axes while passing endwise through said way, and means projecting into the path of the receptacles so as to clean the sides thereof while they are passing through the guide-way and are being turned over therein.

JOSEPH MERRITT.
ERNEST WALKER SMITH.

Witnesses:
CHARLOTTE S. HULL,
CAROLINE M. BRECKLE.

Copies of this patent may be obtained for five cents each, by addressing the "Commissioner of Patents, Washington, D. C."